United States Patent [19]

Gabriel

[11] Patent Number: 4,584,471

[45] Date of Patent: Apr. 22, 1986

[54] ACTIVE TRANSLATION SENSOR

[75] Inventor: Fred C. Gabriel, Stamford, Conn.

[73] Assignee: The Perkin-Elmer Corporation, Norwalk, Conn.

[21] Appl. No.: 543,569

[22] Filed: Oct. 19, 1983

[51] Int. Cl.$^4$ .................................................. H01J 3/14
[52] U.S. Cl. ........................... 250/237 G; 250/231 SE; 340/347 P
[58] Field of Search ............... 250/237 G, 231 R, 578, 250/231 SE; 356/395; 340/347 P

[56] References Cited

U.S. PATENT DOCUMENTS

| | | | |
|---|---|---|---|
| 4,114,035 | 9/1978 | Herzog | 250/237 G |
| 4,499,374 | 2/1985 | Kabaya | 250/237 G |
| 4,507,647 | 3/1985 | Minami et al. | 250/237 G |
| 4,518,859 | 5/1985 | Hoshika | 250/237 G |

Primary Examiner—David C. Nelms
Assistant Examiner—M. Messinger
Attorney, Agent, or Firm—Thomas P. Murphy; Edwin T. Grimes; Richard C. Wilder

[57] ABSTRACT

The present invention is directed to a new and improved active translation sensor which includes a first member having a fixed transmission grating, a second member having a movable linear array of light-emitting diodes disposed juxtaposition relationship with respect to one side of the fixed transmission grating, the second member being movable with respect to the other, electrical circuitry is being provided for successively applying electrical energy to each of the light-emitting diodes in a cyclical manner, a photodetector disposed on the other side of the fixed transmission on grating for detecting light transmitted through the grating, a phase detector for receiving a first signal corresponding to the phase of the circuitry for successively applying the electrical energy to the light-emitting diodes and second signal corresponding to the light detected by the photodetector and outputting a signal corresponding to the phase difference between the two signals, thereby indicating the relative linear position of one of the member switch respect to the other. In another form of the invention the same principle is realized from an array of photodiode detectors in place of the light-emitting diodes and a DC light source illuminating the photodiode array through the grating.

8 Claims, 3 Drawing Figures

ACTIVE TRANSLATION SENSOR

FIELD OF THE INVENTION

This invention relates to optoelectronic devices and, more particularly, to active translation sensors.

BACKGROUND OF THE INVENTION

A familiar technique for increasing the sensitivity to linear motion of a grating-type translation sensor is to observe the moire pattern interference between one fixed grating and another moving one having a slightly different effective pitch. Accurate sensing of the light level transmitted by the grating pair at some reference point makes it possible to interpolate the magnitude of the motions, which are only a fraction of the grating pitch interval. However, accurate sensing of small changes in light is limited by amplifier noise and drift and instability of the light source.

The present invention is intended to overcome or at least ameliorate these problems, as will become apparent as the description proceeds.

SUMMARY OF THE INVENTION

In order to accomplish the desired results, the invention provides in one form thereof a new and improved active translation sensor comprising a first member having a fixed transmission grating, a second member having a movable linear array of light-emitting diodes disposed in juxtaposition relationship with respect to one side of the fixed transmission grating, one of said members being movable with respect to the other. Means are provided for successively applying electrical energy to each of the light emitting diodes in a cyclical manner. Photodetector means are disposed on the other side of the fixed transmission grating for detecting light transmitted through the grating. A phase detector is provided for receiving a first signal corresponding to the phase of the means for successively applying electrical energy to the L.E.D.'s and a second signal corresponding to the light detected by the photodetector and outputting a signal corresponding to the phase difference between the two signals, thereby indicating the relative linear position of one of the members with respect to the other.

In another form of the invention the active translation sensor includes a first member having a fixed transmission grating, a second member having a movable linear array of photodiode detectors disposed in juxtaposition with respect to one side of the fixed transmission grating, one of said members being movable with respect to the other. Means are provided for illuminating the photodiode detectors through the fixed transmission grating with a DC light source. Means are provided for successively making electrical contact with each of the photodiode detectors in a cyclical manner. A phase detector is provided for receiving a first signal corresponding to the phase of the means for successively making electrical contact with each of the photodiode detectors and a second signal corresponding to the light detected by the photodiode detectors respectively and outputting a signal corresponding to the difference between said two signals, thereby indicating the relative linear position of one of the members with respect to the other.

There has thus been outlined rather broadly the more important features of the invention in order that the detailed description thereof that follows may be better understood, and in order that the present contribution to the art may be better appreciated. There are, of course, additional features of the invention which will be described hereinafter and which will form the subject of the claims appended hereto. Those skilled in the art will appreciate that the conception upon which the disclosure is based may readily be utilized as a basis for the designing of other systems for carrying out the several purposes of the invention. It is important, therefore, that the claims be regarded as including such equivalent systems as do not depart from the scope and spirit of the invention.

Several embodiments of the invention have been chosen for purposes of illustration and description, and are shown in the accompanying drawings, forming a part of the specification.

DETAILED DESCRIPTION OF THE INVENTION

Figure 1:
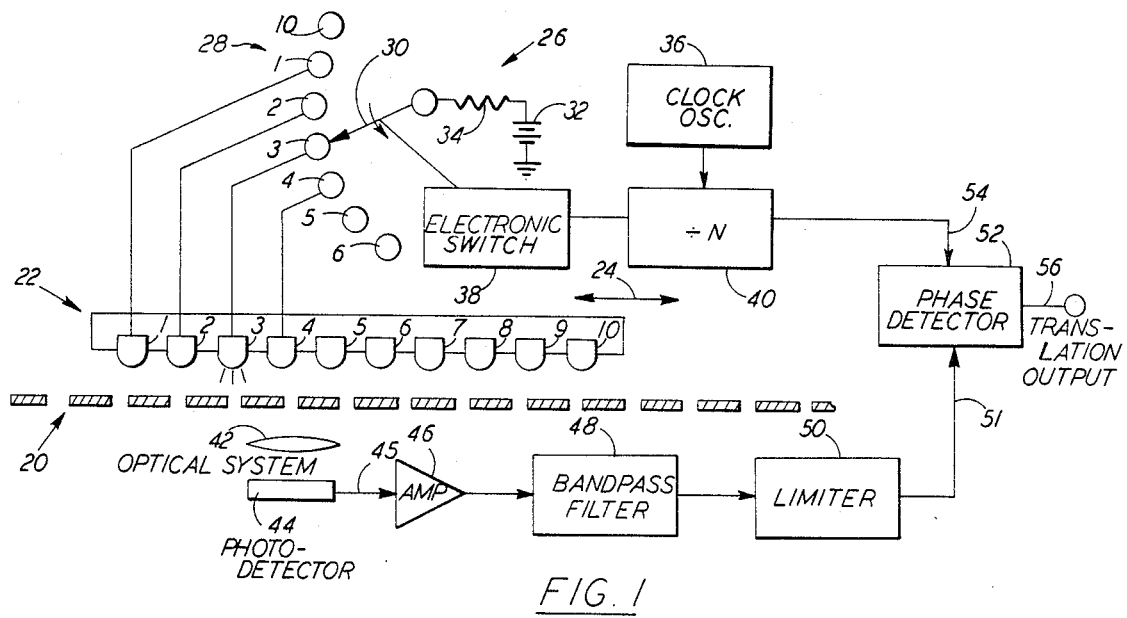
FIG. 1 is a schematic representation of an active translation sensor constructed according to the concepts of the invention.

In the embodiment of the invention illustrated in FIG. 1, an active translation sensor includes a first member comprising a fixed translation rating indicated at 20, and a second member comprising a movable translation carriage 22 carrying a linear array of light-emitting diodes (L.E.D.). Only ten individual L.E.D.'s are shown, as indicated by the numerals 1–10. The array of L.E.D.'s has a slightly different effective pitch than the transmission grating 20. The carriage 22 is disposed in juxtaposition relationship with respect to one side of the fixed transmission grating 20, and it is mounted for linear movement with respect to the fixed transmission grating, as indicated by the arrow 24.

Means are provided for successively applying electrical energy to each of said L.E.D.'s in a cyclical manner. This means includes a switching device, indicated generally at 26, which includes a plurality of fixed contacts indicated generally at 28. Individual contacts are indicated by the numerals 1–6 and 10, which numerals correspond to the individual L.E.D.'s bearing the same numerals to which they are electrically connected, respectively.

In addition, the switching device 26 includes a movable contact 30 to which is applied a source 32 of DC current through a resistor 34. Although the diagram implies a conventional mechanical switch for clarity, a purely electronic multiplex switch is preferably used. Such a switch has no moving parts and makes use of switching transistors or other semiconductor devices as the switch contacts; and hence, has the appropriate high speed.

On the other side of the fixed transmission grating 20 is an optical system, indicated generally at 42, for focusing the light from the L.E.D.'s onto a photodetector 44, which outputs an electrical signal 45 corresponding thereto. This signal is amplified at 46, passes through a band pass filter 48 and a limiter 50 before reaching a phase detector 52. The phase detector receives a reference signal 54 from the divider 40, which corresponds to the means for successively applying electrical energy to the L.E.D.'s and a second signal corresponding to the light detected by the photodetector means 44 and outputs a signal at 56 corresponding to the phase difference between said two signals, thereby indicating the relative linear position of the carriage 22 containing the linear array of L.E.D.'s with respect to the transmission grating 20.

Figure 2:
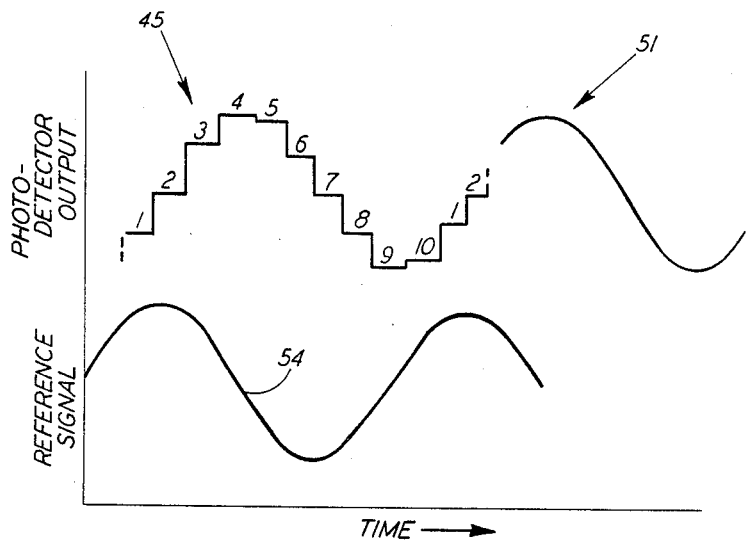
FIG. 2 is a graphical representation showing the phase comparison signals for a fixed sensor position of the embodiment of FIG. 1.

FIG. 2 illustrates the phase comparison signals for a fixed sensor position. Thus, the reference signal 54, which corresponds to the clock oscillator output after passing through the divider 40, is indicated at 54 in FIG. 2. The output 45 from the photodetector 44 is indicated at 45 in FIG. 2. It is noted that the signal detected from each L.E.D. is a step, the corresponding L.E.D. numeral being indicated on each step in FIG. 2. The signal entering the phase detector after passing through the band pass filter and limiter is indicated at 51 in FIG. 2. That is, when the diodes are successively commutated as shown, a repetitive scan results, causing a periodic output signal 51 of fixed frequency to appear at the input of the phase detector.

In operation, if the translation carriage 22 carrying the diode array is moved along the fixed grating 20, as indicated by the arrow 24, the phase of the output signal changes accordingly, with respect to the phase of the diode scan. The scale of this effect can be such that a 360 degree phase-shift corresponds to a motion of one grating division.

As an example, a 20 micron grating can be illuminated by an array of L.E.D.'s spaced at 20 plus micron centers. An arrangement of 400 diodes subdivides the 20-micron grating interval into 0.05-micron resolution steps. It is necessary that the virtual electrical scan speed be large compared to a sensor translation speed of such as, for example, 2 cm/sec or one thousand 20-micron lines per second. This requirement is met by the L.E.D.'s which typically have nanosecond response time, and similarly by the electronic switch.

Figure 3:
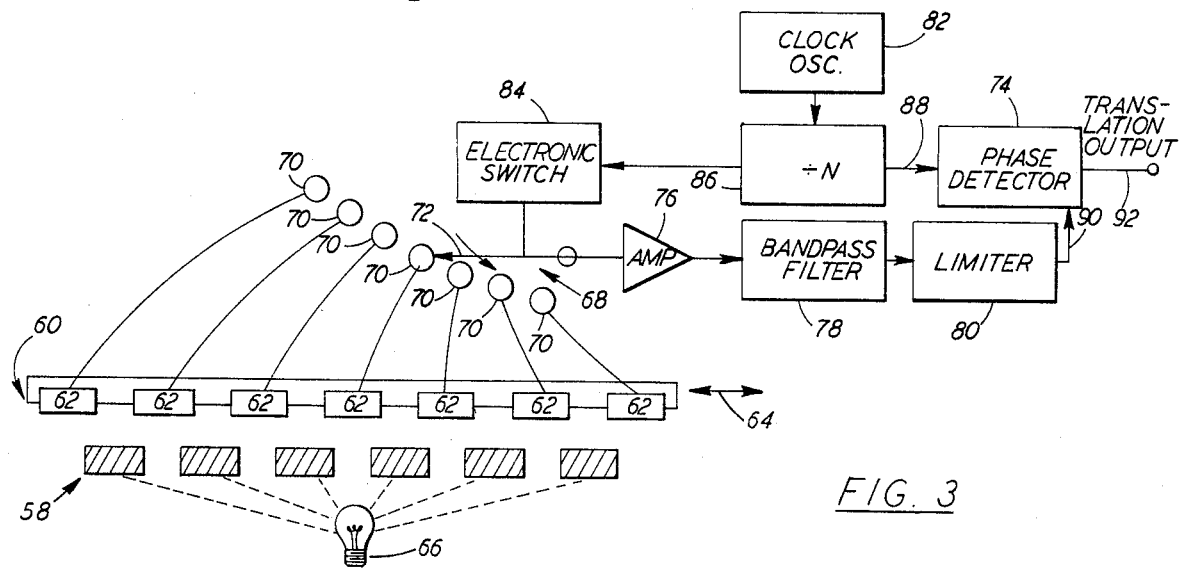
FIG. 3 is a schematic representation of another embodiment of an active translation sensor according to the present invention.

Referring next to the embodiment of FIG. 3, an active translation sensor includes a first member comprising a fixed transmission grating indicated at 58. A second member comprises a movable translation carriage 60 carrying a linear array of photodiode detectors 62. The array of photodiode detectors has a slightly different effective pitch than the transmission grating 58. The carriage 60 is disposed in juxtaposition relationship with respect to one side of the fixed transmission grating 58, and it is mounted for linear movement with respect thereto, as indicated by the arrow 64.

Means are for illuminating the photodiode detectors 62 through the fixed transmission grating 58 from a DC light source 66.

Further, means are supplied for successively making electrical contact with each of said photodiode detectors in a cyclical manner, which comprises a switching device indicated at 68 having a plurality of fixed contacts 70 that are electrically connected to the photodiode detectors 62, respectively. The switching device also includes a commutating contact 72, which is connected to a phase detector 74 through an amplifier 76, a band pass filter 78 and a limiter 80. A clock oscillator 82 provides input to electronic switch 84 through a divider 86, which brings the movable contact 72 into electrical contact successively with each of the fixed contacts in a cyclical manner. As a result the phase detector 74 receives a first or reference signal on line 88 from the divider 86 corresponding to the means for successively bringing the moveable contact 72 into electrical contact successively with each of the fixed contacts in a cyclical manner and a second signal on line 90 corresponding to the light detected by the photodiode detectors 62, respectively. The phase detector 74 outputs a signal indicated at 92 corresponding to the difference between said two signals, thereby indicating the relative linear position of the carriage 60 with respect to the transmission grating 58.

As an example, using a 512-element photodiode detector array a limiting resolution of 0.04 microns can be realized. With this detector array, a shift rate of 40 $MH_z$ for 512 elements generates an output frequency of about 80 $KH_z$ with no motion. Uniform translation of 2 cm/sec in the same direction as the scan will shift this to 79 $KH_z$ while the same velocity in the opposite direction will generate 81 $KH_z$. The phase detector must sense the cumulative phase shift generated by the "crawl" between this and an 80 $KH_z$ reference clock.

A distinguishing feature of the present invention resides in the presence, at all times, of the full-amplitude AC signal, even when there is no translation motion. This makes it much easier to sense slow changes in position, i.e. by measuring phase change instead of sensing small DC level shifts. That is, the mechanical translation being sensed appears as a phase change of a strong AC carrier rather than a sometimes weak DC level shift. Because it is relatively easy to measure electrical phase to a high degree of precision, the results are more accurate than by using the level-sensing techniques of the prior art.

Although specific embodiments have been illustrated and described, it will be obvious to those skilled in the art that various modifications may be made without departing from the spirit and scope of the invention, which is to be limited solely by the appended claims.

What is claimed is:

1. An active translation sensor comprising, in combination:
   a first member comprising a fixed transmission grating;
   a second member comprising a movable linear array of light-emitting diodes disposed in juxtaposition relationship with respect to one side of said fixed transmission grating, said second member being movable with respect to said first member;
   means for successively applying electrical energy to each of said light-emitting diodes in a cyclical manner;
   photodetector means disposed on the other side of said fixed transmission grating for detecting light transmitted through said gratings;
   phase detector means for receiving a first signal corresponding to the phase of said means for successively applying electrical energy to said light-emitting diodes and a second signal corresponding to the light detected by said photodetector means and outputting a signal corresponding to the phase difference between said two signals, thereby indicating the relative linear position of one of said members with respect to the other.

2. An active translation sensor according to claim 1 wherein said means for successively applying electrical energy to each of said light-emitting diodes in a cyclical manner comprises a switching device having a plurality of fixed contacts and a commutating contact, said fixed contacts being connected to said light-emitting diodes respectively, means for applying a DC current to said movable contact, motive means for bringing said movable contact into electrical contact successively with each of said fixed contacts in a cyclical manner.

3. An active translation sensor according to claim 2 wherein said motive means includes a clock oscillator.

4. An active translation sensor according to claim 1 wherein a band pass filter is mounted between said photodetector means and said phase detector means.

5. An active translation sensor comprising, in combination:
- a first member comprising a fixed transmission grating;
- a second member comprising a movable linear array of photodiode detectors disposed in juxtaposition relationship with respect to one side of said fixed transmission grating, said second member being movable with respect to said first member;
- means for illuminating said photodiode detectors through said fixed transmission grating with a DC light source;
- means for successively making electrical contact with each of said photodiode detectors in a cyclical manner;
- phase detectors means for receiving a first signal corresponding to the phase of said means for successively making electrical contact with each of said photodiode detectors and a second signal corresponding to the light detected by said photodiode detectors respectively and outputting a signal corresponding to the difference between said two signals, thereby indicating the relative linear position of one of said members with respect to the other.

6. An active translation sensor according to claim 5 wherein said means for successively making electrical contact with each of said photodiode detectors in a cyclical manner comprises a switching device having a plurality of fixed contacts and a commutating contact, said fixed contacts being connected to said photodiode detectors respectively, motive means for bringing said movable contact into electrical contact successively with each of said fixed contacts in a cyclical manner, said movable contact being in electrical connection with said phase detector means.

7. An active translation sensor according to claim 6 wherein said motive means includes a clock oscillator.

8. An active translation sensor according to claim 6 wherein a band pass filter is mounted between said movable contact and said phase detector means.

* * * * *